United States Patent [19]

Takahashi et al.

[11] 4,398,260

[45] Aug. 9, 1983

[54] SKID CONTROL METHOD

[75] Inventors: Junichi Takahashi, Katsuta; Takanori Shibata, Hitachi; Shotaro Naito; Keiichi Tokuyama, both of Katsuta, all of Japan

[73] Assignee: Hitachi, Ltd., Tokyo, Japan

[21] Appl. No.: 148,047

[22] Filed: May 8, 1980

[30] Foreign Application Priority Data

May 18, 1979 [JP] Japan ................................. 54-60468
Aug. 1, 1979 [JP] Japan ................................. 54-97327

[51] Int. Cl.$^3$ ............................ G01P 3/48; B60T 8/02
[52] U.S. Cl. ......................................... 364/565; 303/93; 324/166; 361/240; 364/426
[58] Field of Search ................ 364/424, 426, 565; 303/20, 91, 93, 100, 108, 109, 110; 361/238, 240; 324/166

[56] References Cited

U.S. PATENT DOCUMENTS

| | | | |
|---|---|---|---|
| 3,806,205 | 4/1974 | Hida et al. | 364/426 |
| 4,040,677 | 8/1977 | Bleckmann | 303/95 |
| 4,050,747 | 9/1977 | Ruhnau et al. | 364/424 X |
| 4,056,287 | 11/1977 | Gudat | 364/426 X |
| 4,113,322 | 9/1978 | Ruhnau et al. | 303/105 |
| 4,136,912 | 1/1979 | Hesse et al. | 303/91 |
| 4,166,976 | 9/1979 | Ruhnau et al. | 364/565 X |
| 4,184,203 | 1/1980 | Skarvada | 364/426 |
| 4,321,677 | 3/1982 | Takahashi et al. | 364/426 |
| 4,335,431 | 6/1982 | Takahashi | 364/426 |

*Primary Examiner*—Felix D. Gruber
*Attorney, Agent, or Firm*—Antonelli, Terry & Wands

[57] ABSTRACT

A skid control device employs a wheel speed sensor and the control circuit which includes a microcomputer. The microcomputer computes wheel speed on the basis of a pulse signal derived from the wheel speed sensor and delivers a break releasing signal when the wheels slip. A brake control apparatus for controlling the pressure of oil for applying the brakes to the wheels responds to the outputs of the microcomputer. The microcomputer contains a free-running counter which counts clock pulses and a memory containing a sequence of storage locations. This sequence of storage locations stores count values of the free-running counter. A pulse signal from the wheel speed sensor is employed to produce an interrupt request for the microcomputer. The contents of successively adjacent locations in memory are employed by the microcomputer for carrying out the necessary calculations and computing wheel speed.

11 Claims, 19 Drawing Figures

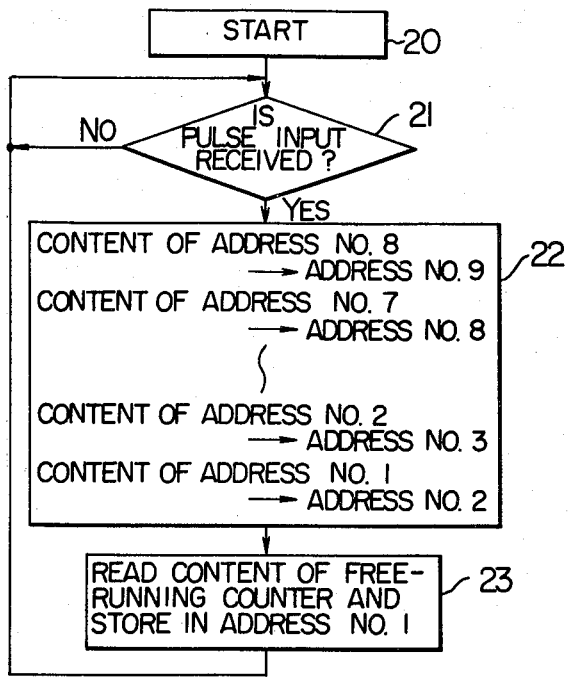
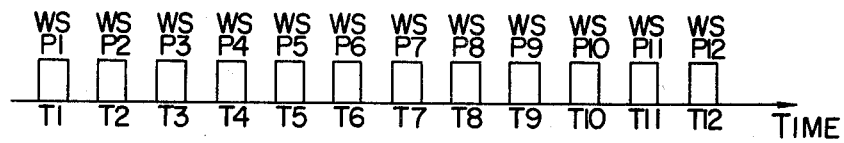
| FIG. 13 | | FIG. 14 | | FIG. 15 | |
|---|---|---|---|---|---|
| ADDRESS NO.1 | T9 | ADDRESS NO.1 | T10 | ADDRESS NO.1 | T12 |
| ADDRESS NO.2 | T8 | ADDRESS NO.2 | T9 | ADDRESS NO.2 | T11 |
| ADDRESS NO.3 | T7 | ADDRESS NO.3 | T8 | ADDRESS NO.3 | T10 |
| ADDRESS NO.4 | T6 | ADDRESS NO.4 | T7 | ADDRESS NO.4 | T9 |
| ADDRESS NO.5 | T5 | ADDRESS NO.5 | T6 | ADDRESS NO.5 | T8 |
| ADDRESS NO.6 | T4 | ADDRESS NO.6 | T5 | ADDRESS NO.6 | T7 |
| ADDRESS NO.7 | T3 | ADDRESS NO.7 | T4 | ADDRESS NO.7 | T6 |
| ADDRESS NO.8 | T2 | ADDRESS NO.8 | T3 | ADDRESS NO.8 | T5 |
| ADDRESS NO.9 | T1 | ADDRESS NO.9 | T2 | ADDRESS NO.9 | T4 |

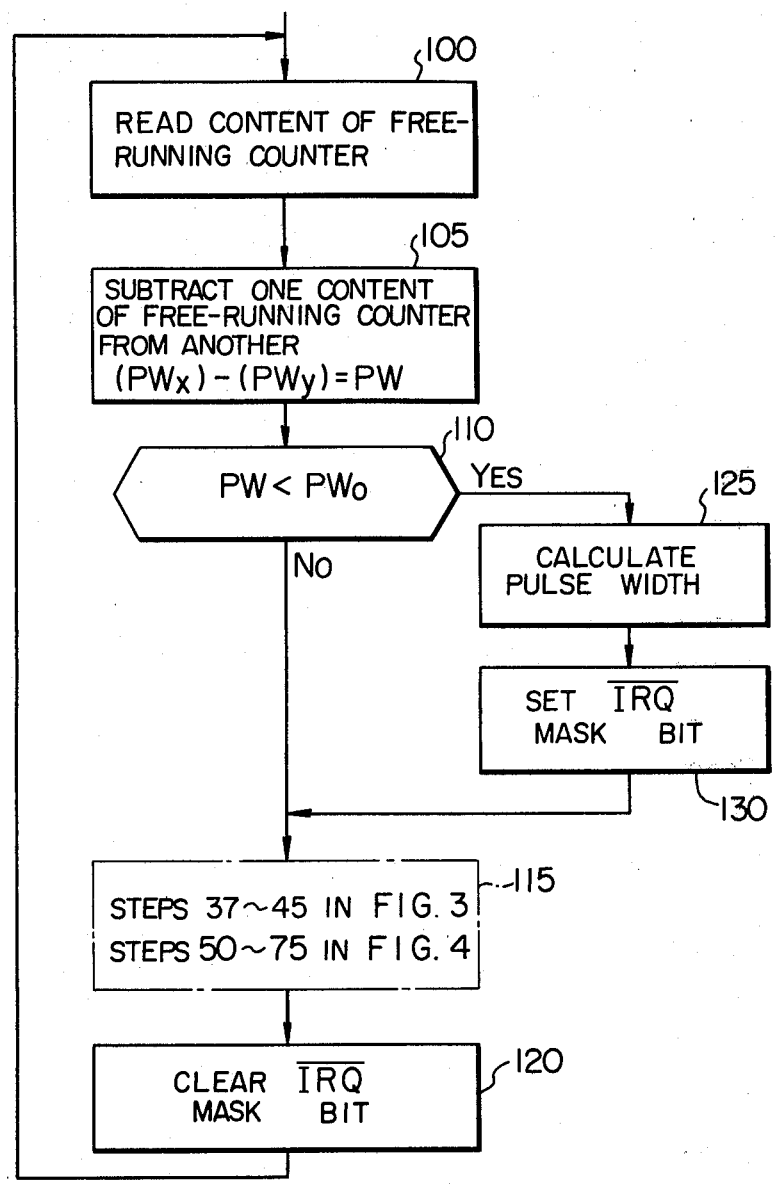

SKID CONTROL METHOD

CROSS-REFERENCE TO RELATED APPLICATIONS

The present application relates to subject matter disclosed in copending application Ser. No. 128,863 filed Mar. 10, 1980 now U.S. Pat. No. 4,335,431 and copending application Ser. No. 118,909 filed Feb. 6, 1980, now U.S. Pat. No. 4,321,677 issued Mar. 23, 1982.

FIELD OF THE INVENTION

This invention relates to a skid control method for controlling the pressure of braking oil when a vehicle slips during a vehicle braking operation and more particularly to such a method using a microcomputer.

BACKGROUND OF THE INVENTION

In skid control, the slip rate is calculated from the calculated wheel speed and when the calculated slip rate reaches a predetermined value, the brakes are released, while when the slip rate is restored to another preset value, the braking oil pressure is reapplied. The time during which the brakes are released is measured and the next instant of brake release is controlled on the basis of the result of the measurement. Repeating this series of operations thereafter, the frictional coefficient between the wheels and the road surface is kept at a maximum value so that the stopping distance is shortened.

The calculation of the wheel speed is one of the most important factors necessary for skid control as a whole and therefore must be processed exactly and swiftly.

To calculate the wheel speed from the signal delivered by the wheel speed sensor, there are two methods such as a proposed method in which pulses from the wheel speed sensor are counted for a predetermined constant time and a method in which the time interval between adjacent pulses is measured. The former method is not adapted for an anti-skid apparatus which requires rapid calculations, since this method needs to count pulses and therefore requires a certain time. The latter method, which measures the interval between adjacent pulses, can perform a rapid processing since only a time equal to the pulse-to-pulse period is required in this case. However, the measurement of only the pulse-to-pulse period results in a rather large error and therefore in practical applications it is necessary to measure several numbers of such periods and to figure out the average of them. Accordingly, it becomes difficult also in this case to complete the processing in a very short time.

The pulse-to-pulse periods are successively stored in a memory (RAM) and they are read out for processing in the case of the wheel speed being calculated. At the time of calculating the wheel speed, it is necessary to check which data block is to be used. According to methods currently adopted, the program for calculation is very complicated so that the number of locations in memory used for calculation processing is considerable.

SUMMARY OF THE INVENTION

An object of this invention is to provide a skid control apparatus which has a high speed of processing the calculation of the wheel speed and uses only a small number of memory locations for the calculation.

According to the features of this invention, the sampling timing for detecting the wheel speed is varied in accordance with the change in the wheel speed, the newest data representing the pulse-to-pulse period derived from the wheel speed sensor is stored in the head location of the memory, and the data is always subjected to rearrangement from the head location to the succeeding ones in memory according to the order of arrival.

Other objects, features and advantages of this invention will be apparent when one reads the following description of the embodiment of thie invention with the aid of the attached drawings, in which:

BRIEF DESCRIPTION OF THE DRAWINGS

FIG. 11 is a flow chart for the processing of taking in the content of the free-running counter to the specific memory according to this invention;

FIGS. 12 to 15 illustrate how to store data in RAMS;

FIG. 18 is a flow chart associated with the signals shown in FIG. 17.

DETAILED DESCRIPTION OF THE INVENTION

Figure 1:
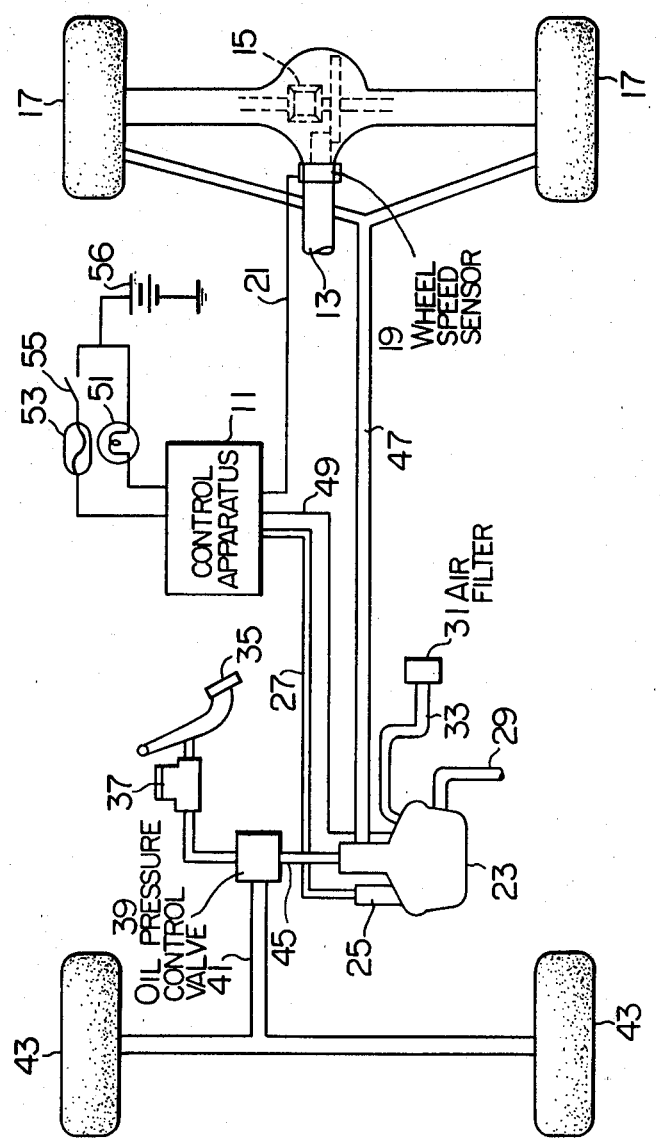
FIG. 1 schematically shows a skid control system using a microcomputer, as an embodiment of this invention.

FIG. 1 schematically shows a skid control systemm using a microcomputer (hereafter referred to as CPU), as an embodiment of this invention. The mechanical power generated by an engine (not shown) is transmitted through a transmission gear assembly (not shown) and a propeller shaft 13 to a differential gear 15, which in turn drives rear wheels 17. The output signals of a wheel speed sensor 19 attached to the propeller shaft 13 are sent through a signal line 21 to a control apparatus 11. The control apparatus incorporates therein a CPU and an I/O circuit (i.e. input/output circuit). A detailed description thereof will be given later. An actuator 23 has a solenoid 25 energized by an output signal sent from the control apparatus 11 through a signal line 27. The diaphragm chamber in the actuator 23 communicates with the engine manifold having a negative pressure through a pipe 29 and with the surrounding atmosphere through an air filter 31 and pipe 33. The diaphragm of the diaphragm chamber is coupled to a piston rod. The force generated by depressing a brake pedal 35 is converted to an oil pressure by means of a master cylinder 37. The induced oil pressure is transmitted to an oil pressure control valve 39. The oil pressure discharged from the oil pressure control valve 39 is used, through a pipe 41, to brake front wheels 43 and also transmitted to the actuator through a pipe 45. The pressured oil whose pressure was controlled by the piston rod in the actuator 23, is used, through a pipe 47, to brake the rear wheels 17. The control apparatus 11 and the negative voltage terminal of the actuator 23 are connected together through a conductor line 49, to have the same potential. The control apparatus 11 also has a warning lamp 51 connected therewith for warning of a malfunction of the system. A fuse 53 is inserted between the control apparatus 11 and a power source 56, the fuse 53 serving to cut the supply of power to the control apparatus to establish the normal braking condition when an abnormality occurs. When an ignition key switch 55 is turned on, electric power is supplied from the power source 56 to the control apparatus 11 through the fuse 53.

At the time of the brake being applied, if the solenoid 25 is turned on, the piston rod coupled to the diaphragm in the actuator 23 is shifted so that the oil pressure decreases to release the braking force.

Figure 2:
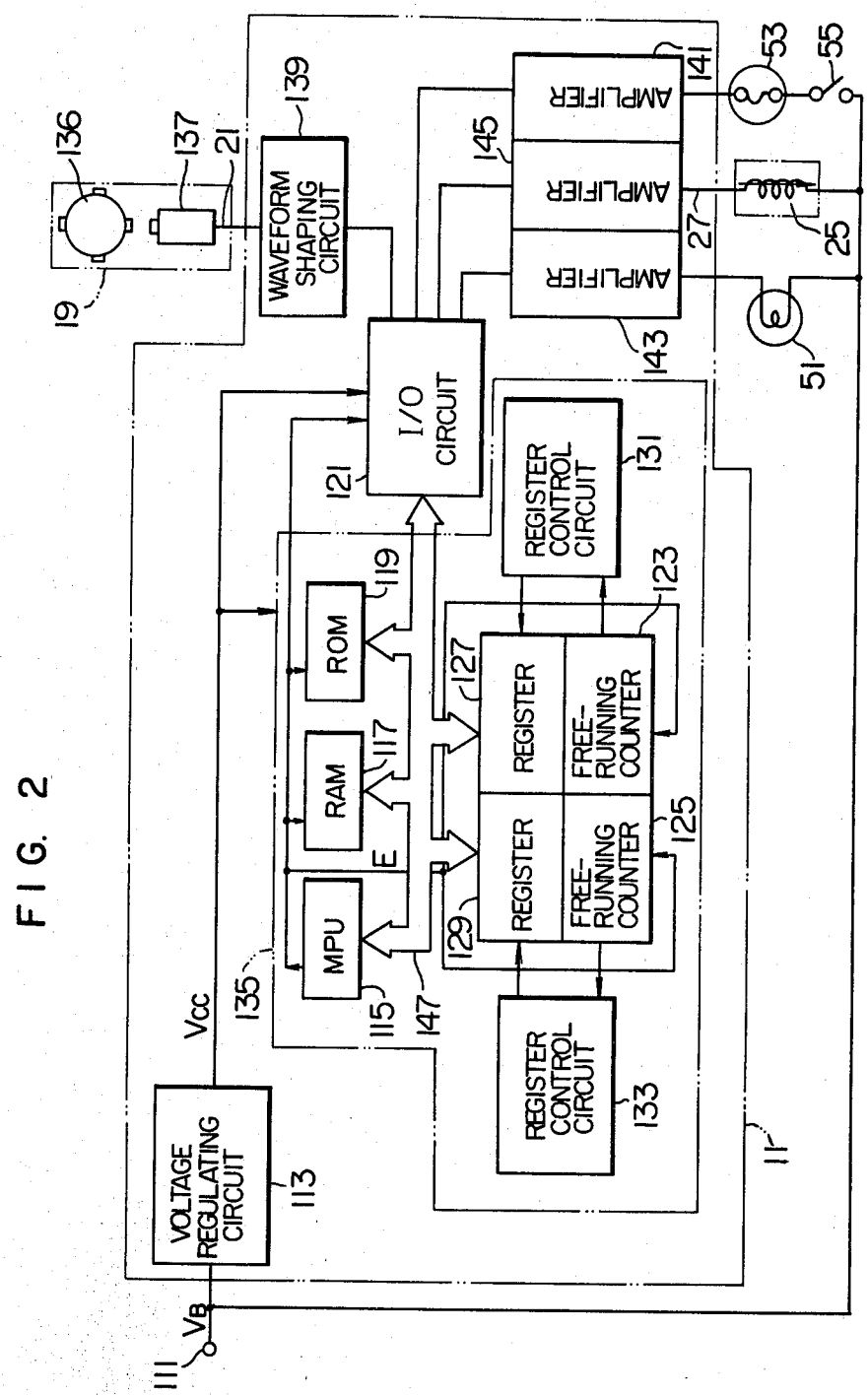
FIG. 2 shows in detail the principal part of the skid control system shown in FIG. 1.

FIG. 2 shows in detail the circuit of the control apparatus 11 shown in FIG. 1. The positive voltage terminal 111 of the control apparatus 11 is connected with the positive electrode of the power source and therefore a voltage $V_B$ is supplied to the control apparatus 11. The power source voltage $V_B$ is kept constant, for example, at +5 V, by means of a voltage regulating circuit 113. This constant voltage $V_{cc}$ of, for example, +5 V is applied to a CPU 135. The CPU 135 includes therein a MPU (Microprocesser) 115, a RAM (Random Access Memory) 117, a ROM (Read-Only Memory) 119, register control circuits 131 and 133, free-running counters 123 and 125, and registers 127 and 129. The constant voltage $V_{cc}$ is also supplied to an I/O (input/output) circuit 121. The microcomputer unit, MC6801, sold by Motorola Inc. is known as incorporating a free-running counter therein.

The wheel speed sensor 19 converts the rotational speed of a rotor 136 to a corresponding AC voltage by its electromagnetic pickup 137. The output of the pickup 137, i.e. the signal representing the rotational speed of the rotor 136, is supplied through a waveform shaping circuit 139 to the I/O circuit 121. The outputs of the I/O circuit 121 are supplied through amplifiers 141, 143 and 145 to the fuse 53, the warning lamp 51 and the solenoid 25.

The MPU 115, the RAM 117, the ROM 119, the registers 127 and 129, and the I/O circuit 121 are interconnected with one another through data bus, address bus and control bus 147 (all the buses are indicated by reference numeral 147). A clock signal E is sent from the MPU 115 to the RAM 117, the ROM 119, the free-running counters 123 and 125, and the I/O circuit 121, whereby the data transmission is performed in synchronism with this clock signal E. The free-running counters 123 and 125 count the pulses of the clock signal E. When the count value overflows the counters 123 and 125, they send an overflow signal to the register control circuits 131 and 133 respectively so that the counters 123 and 125 are reset to their initial states and resume counting, repeating these cycles. The register control circuit 131 and 133 control the timing when to store the contents of the free-running counters 123 and 125 in the registers 127 and 129 respectively.

Now, description will be given of the operation of the skid control system as an embodiment of this invention.

If a rolling body, e.g. a vehicle, moving at a speed of V in a certain direction on a plane, slips, then the associated slip rate S is defined such that $$S = (V - \omega R) \times \frac{100}{V} \, (\%) \tag{1}$$

where R is the radius of the rolling body and $\omega$ is the angular velocity of the rolling body. Here, it is to be noted that the frictional coefficient $\mu$, defined between the tire of the vehicle and the road surface bearing the tire thereon, is a function of the slip rate S. According to experiments, it has been determined that the frictional coefficient $\mu$ takes a maximum value in the direction of forward movement when the slip rate is near 20%, while $\mu$ decreases with the increase in S in the case of lateral slipping. Accordingly, if the slip rate S is controlled to be near 20%, the frictional coefficient $\mu$ between the tire and the road surface could be made maximum when the car skids. The skid control apparatus according to this invention controls the slip rate S in such a manner that S is near 20% in the case of skidding.

Figure 3:
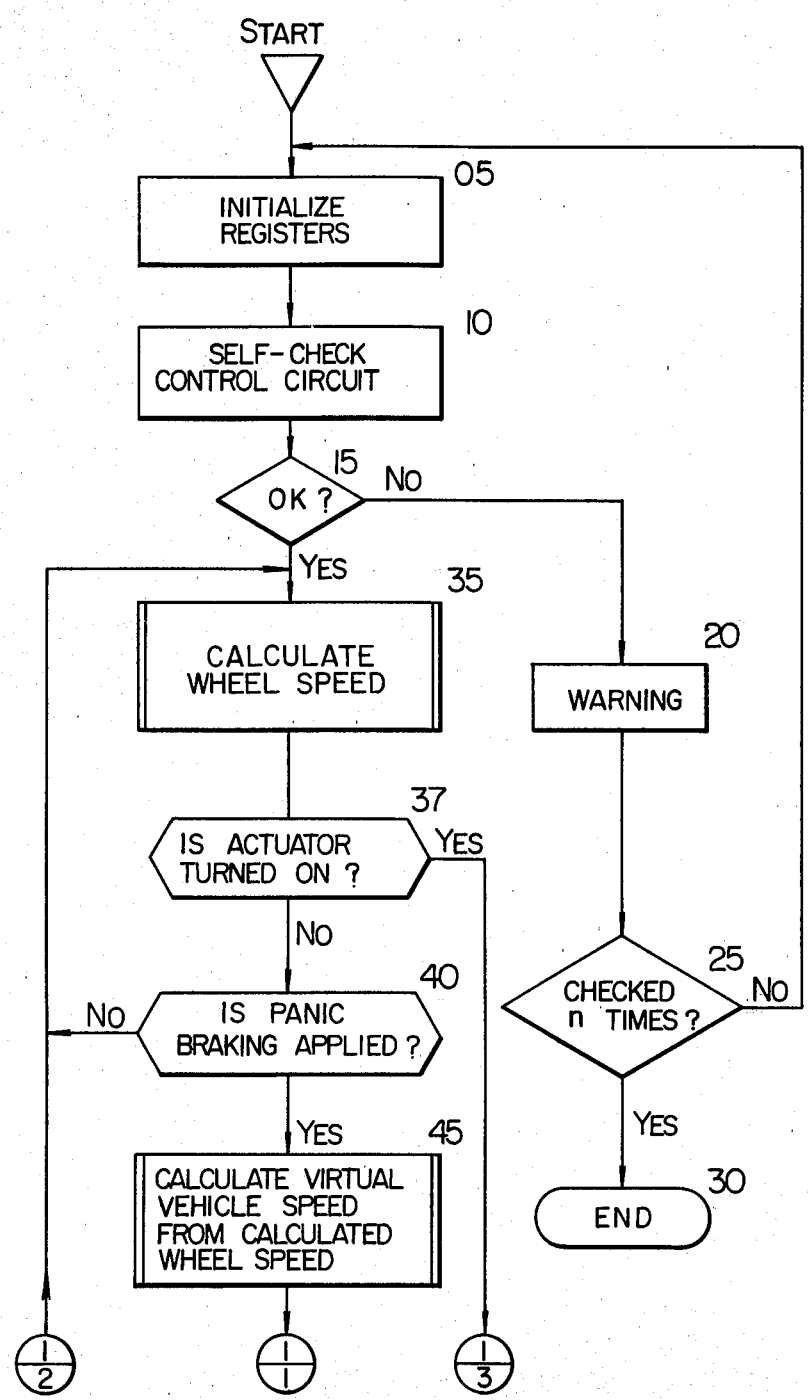
FIGS. 3 and 4 show flow charts for explaining the operation of the skid control system shown in FIG. 1 or 2.
Figure 4:
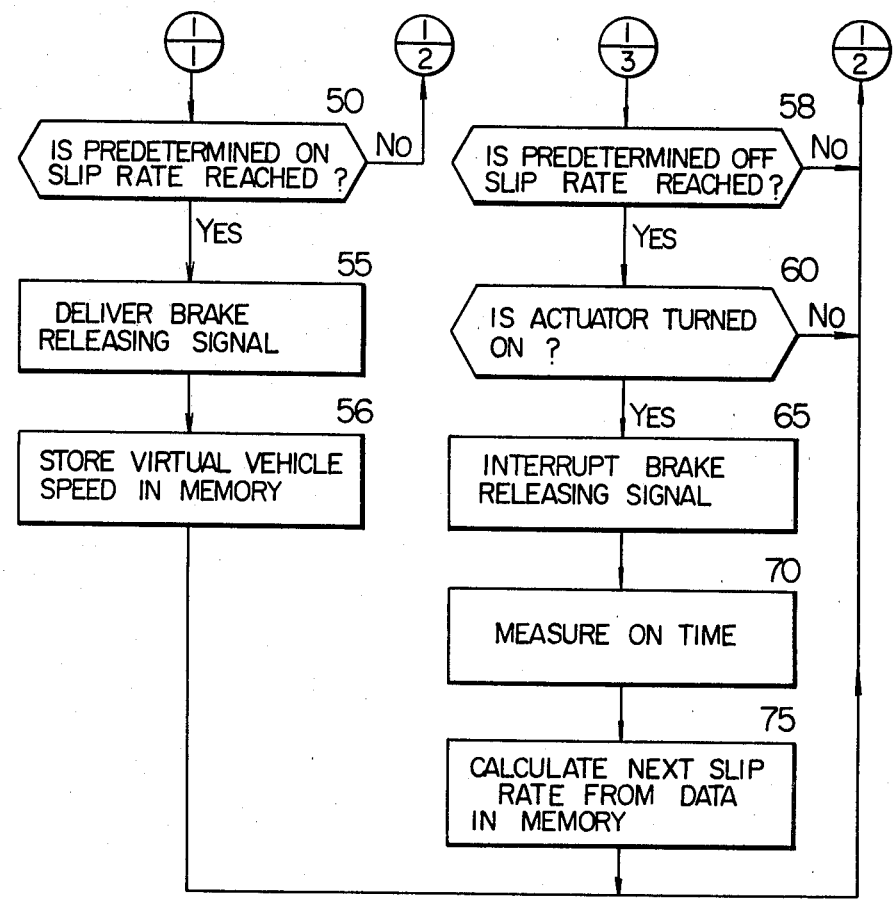

FIGS. 3 and 4 show a flow chart for explaining the operation of the control system according to this invention. As shown in FIG. 3, in step 05, the register group is initialized and simultaneously the polarity of a trigger signal for storing the contents of the free-running counters into the registers is specified. In step 10, a self-check of the control circuits, especially the functions of the memories and the I/O circuit, is performed. The MPU generates specific patterns and if a signal corresponding to the patterns is received, the check is determined to be OK in step 15. When an abnormal condition is found by the self-check, the abnormality is indicated by the warning lamp 15 (step 20). In this case the self-checks are performed a predetermined number of times in step 25. If the abnormal condition still remains after all the self-checks have been made, a warning lamp will be turned on and the operation is stopped in step 30. In this case, the normal braking operation is performed, but the skid control is not put into operation.

Figure 5:
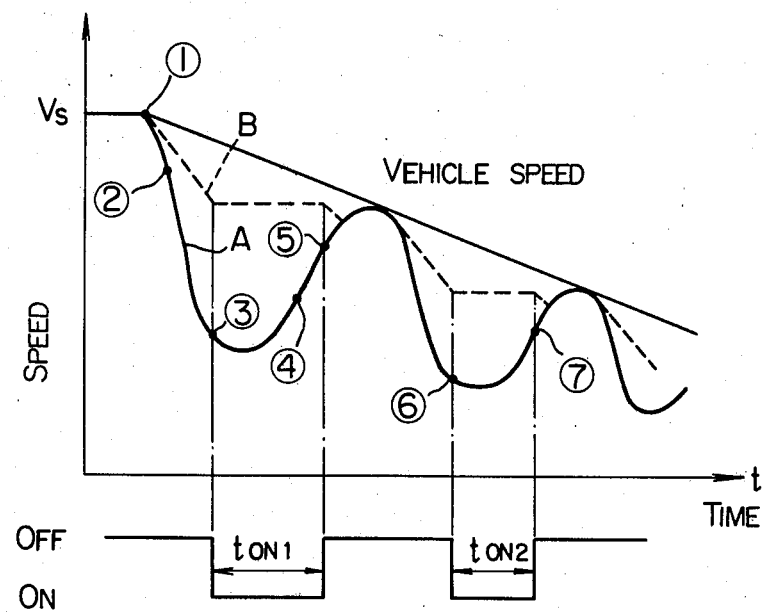
FIG. 5 shows in graphical representation the relationship among the vehicle speed, the virtual vehicle speed, the wheel speed and the operation of the actuator for controlling the brake oil pressure, at the time of panic braking.

When the self-check is O.K. in the step 15, the brake control operation moves to step 35. In the step 35, stored data is read out and a subtracting calculation operation between the registers yields the wheel speed. In step 37, whether the solenoid of the actuator is energized or not is checked. Initially, the solenoid is deenergized or off. In step 40, whether panic braking is applied or not is checked on the basis of the variation of the wheel speed. Namely, if the decrease in the wheel speed exceeds a preset value, panic braking is identified. This point is explained with the aid of FIG. 5. FIG. 5 shows the relationship among vehicle speed, virtual vehicle speed, wheel speed and the decrease (ON) and increase (OFF) in the brake oil pressure, in the case where the brake oil pressure is so controlled as to cause the frictional coefficient between the wheel and the road surface to be maximum when panic braking is applied. Now, assume that a vehicle is moving at a speed $V_S$. If the vehicle is suddenly braked under this condition, the wheel speed is decreased along curve A as shown in FIG. 5.

Turning again to FIG. 3, if there is no panic braking, the step 35 is again reached to calculate the wheel speed. At the time of normal operation (driving without panic braking), a closed loop of the steps 35 to 40 is repeatedly executed. When panic braking is detected in the step 40, step 45 is reached. In the step 45, the virtual vehicle speed is derived from the calculated wheel speed.

Here, the virtual vehicle speed should be exactly defined. In the expression for the skid rate S, V is defined as the speed of the rolling body (this corresponds to the vehicle speed). Therefore, the vehicle speed must be calculated to obtain the slip or skid rate S. Since a vehicle is stopped by braking its four wheels, it is impossible to obtain the real vehicle speed directly. Accordingly, the virtual vehicle speed to give the measure of the actual vehicle speed must be obtained to be used and defined as one of the controlling items. In general the virtual vehicle speed is assumed to have a gradient of $-1.4 - -1.7$ g (gravity acceleration) and the slip rate S given by the above expression (1) is calculated under this assumption. In FIG. 5, broken curve B represents the virtual vehicle speed, which decreases at the above mentioned gradient at the deceleration starting point ①. On the basis of the comparison between the wheel speed calculated in the step 35 and the virtual vehicle speed calculated in the step 45, whether the predetermined ON slip rate is reached or not is checked in step 50 in FIG. 4, the ON slip rate being the one for which the solenoid of the actuator is to be turned on. When the predetermined ON slip rate is detected in the step 50, that is, when the point ③ in FIG. 5 is reached, a brake releasing signal is generated in step 55. The ON slip rate at the point ③ is preferably equal to 0.5, as required by empirical factors. The brake releasing signal is stored in the memory in step 56. After the brake releasing signal has been delivered, the control operation is returned to the step 35 in FIG. 3. Since the actuator is turned on in step 37, step 58 in FIG. 4 is then executed. In the step 58, whether the slip rate is equal to the predetermined OFF slip rate or not is checked on the basis of a comparison between the wheel speed and the virtual vehicle speed, the predetermined OFF slip rate being the factor which leads the solenoid of the actuator to be deenergized or OFF. The predetermined OFF slip rate is always kept constant at, for example, 0.2 at the point ⑦ as well as the point ⑤ in FIG. 5. If the actual slip rate is below the predetermined OFF slip rate, that is, it corresponds to the point ④ in FIG. 5, then the control operation is returned to the step 35. When the predetermined OFF slip rate is reached, that is, any point after the point ⑤ in FIG. 5 is reached, step 60 is executed. In the step 60, unless the actuator is being energized, the step 35 is resumed, while if the actuator is being energized the step 65 is executed. In the step 65, the brake releasing signal is interrupted and in step 70 the ON time (the period for which the brake releasing signal lasts) is measured. In step 75, the predetermined ON slip rate necessary for the next control, i.e. the slip rate corresponding to the point ⑥ in FIG. 5, is taken from the memory on the basis of the ON time measured in the step 70 and the value taken is then stored in the specified memory. The control operation is then transferred to step 35. The ON time for which the brake releasing signal lasts, varies depending on the magnitude of the frictional coefficient.

Moreover, the virtual vehicle speed is assumed to have a gradient of $-1$ g and the timing at which the second and succeeding brake releasing signals are delivered is changed, to correct the virtual vehicle speed, depending on the ON time $t_{ON}$ obtained in the immediately previous control cycle. Namely, the slip rare required in the second or succeeding control is a function of the ON time $t_{ON}$.

Figure 6:
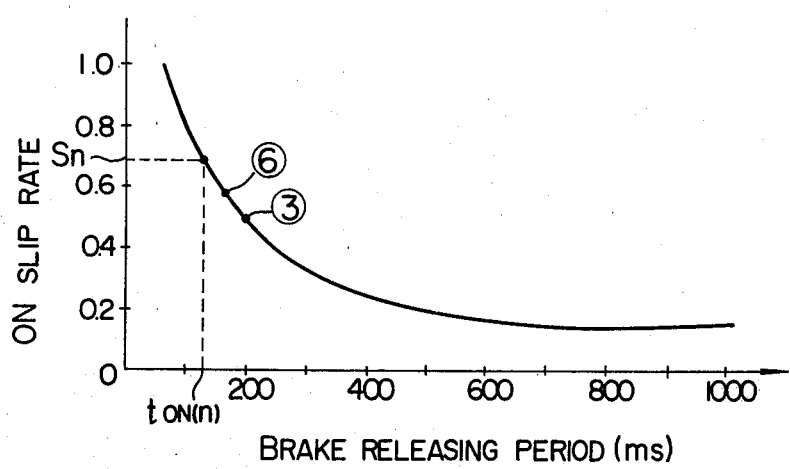
FIGS. 6 shows the relationship between the brake releasing period and the slip rate S.

FIG. 6 shows the relationship between the ON time $t_{ON}$ and the predetermined ON slip rate S. It is assumed that the n-th brake releasing signal lasts for a period $t_{ON(n)}$ as shown in FIG. 6. Then, the predetermined ON slip rate S for determining the timing at which the (n+1)th brake releasing signal is delivered is calculated to be $S_n$. Thereafter, similar operations are repeated until the wheels stop. Since it is difficult to express the relationship shown in FIG. 6 by an equation, it is stored in the memory with discrete sampling values at specific intervals, e.g. every 10 mS. It is therefore possible that if the ON time $t_{ON(n)}$ is measured, $S_n$ is immediately obtained. The points ③ and ⑥ in FIG. 6 correspond to the points ③ and ⑥ in FIG. 5.

Figure 7:
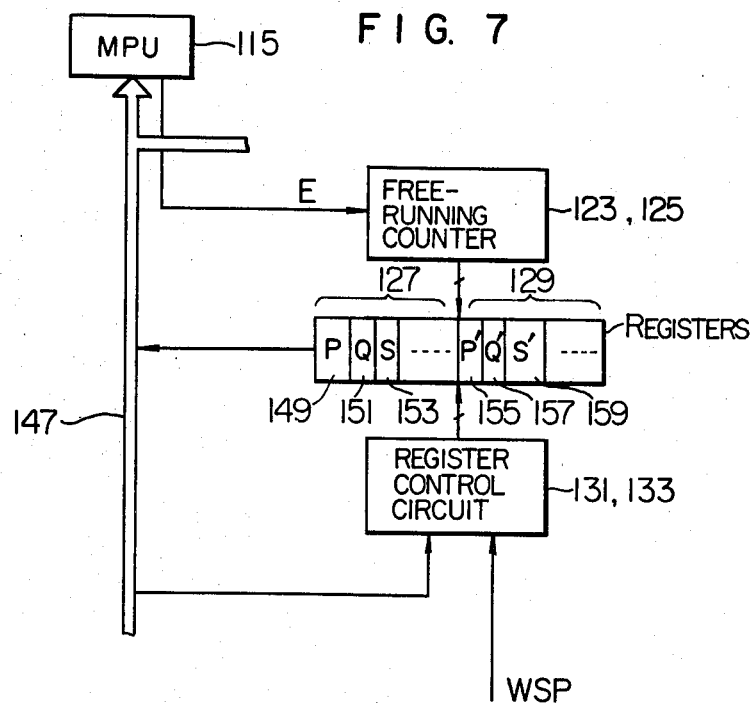
FIG. 7 is a block diagram useful in explaining the functions of the free-running counter, the register and the register control circuit.
Figure 8A:
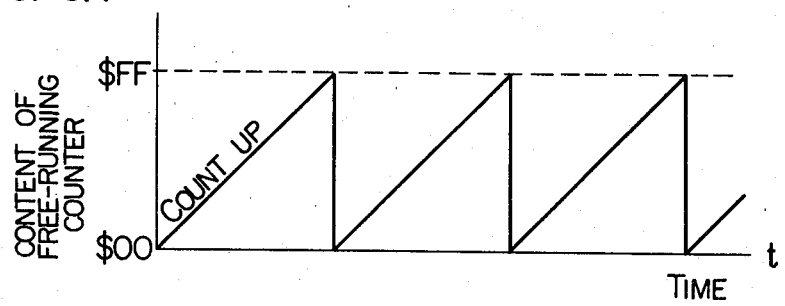
FIGS. 8A and 8B are diagrams useful in explaining the operation of the free-running counter.
Figure 8B:
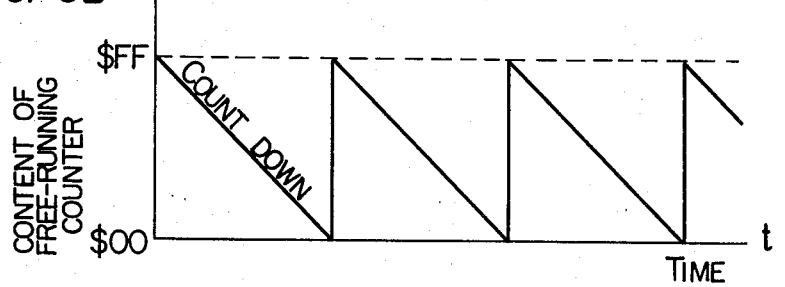

FIG. 7 is a diagram for explaining the operations of the free-running counters 123 and 125, the registers 127 and 129, and the register control circuits 131 and 133. A reference clock signal E generated by the MPU 115 is sent to the free-running counter 123 (hereafter only one of the equivalent members is mentioned for simplicity). The free-running counter 123 counts up or down in synchronism with the clock signal E, starting at the count value specified by the initialization cycle as shown in FIG. 8A or 8B, irrespective of the operation of the MPU 115. According to the mode shown in FIG. 8A, the counter 123 counts up, starting from the value $00 set through the initialization, and when the content of the counter 123 becomes equal to $FF, the count value is reduced to $00 in response to the next coming clock signal E. Thereafter, the above operation is repeated. On the other hand, according to the mode shown in FIG. 8B, the counter 123 counts down from the value $FF set through the initialization and when the count value reaches $00, it jumps up to $FF in response to the next clock signal E, being prepared again for counting down. Either of the modes can be selected depending on the method of control required.

The MPU 115 sends to the register control circuit 131 an instruction to cause the circuit 131 to send a trigger signal to the register 127 in response to the leading or trailing edge of the input signal, e.g. WSP (wheel speed pulse). In response to the trigger signal, the register 127 takes in and stores therein the content of the free-running counter 123, reached when the trigger signal is generated. The register 127 is, for example, of 16-bit structure.

Figure 9:
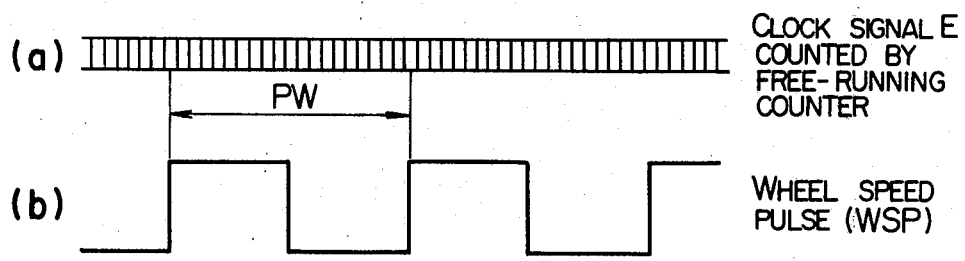
FIG. 9 illustrates how to obtain the period of the wheel speed pulses.

FIG. 9 illustrates a technique for obtaining the period of the WSP (wheel speed pulse) signal. Software controls the delivery of the trigger signal in response to the leading edge or the trailing edge to take in the wheel speed. In FIG. 9, it is assumed that the trigger signal is delivered in response to the leading edge of the WSP according to the program. This instruction for triggering is effected through the software and the register control circuit 131 shown in FIG. 7 which holds the old instruction unless this instruction is sent to the circuit 131 to rewrite its content. When a signal indicating the leading edge of the WSP is received, the count value at that instant of the free-running counter 123 is stored in the Q register 151 of the register 127 shown in FIG. 7.

When a signal indicating the leading edge of the next WSP or the n-th (n<10) following WSP in the case of a high wheel speed is received, the count value of the free-running counter at that instant is stored in the P register 149 of the register 127 shown in FIG. 7. The operation of storing the contents of the free-running counter into the P and Q registers is performed by the event transition of the WSP, that is, the interrupt operation is performed in response to the WSP signal and the count values are stored through the interrupt processing. The time required for storing each content is 4–5 μsec. so that the storing operation by the P and Q registers is finished in about 9 μsec. According to this method described above, the duration or width of a pulse of a pulse signal having a long repetition period can be measured for about 9 μsec. Accordingly, the requirement according to the conventional measuring method that the MPU must be exculsively used over the duration of a pulse in the measurement of the pulse width can now be eliminated. Therefore, each of the times required for various processings necessary for the skid control now in question can be shortened.

Figure 10:
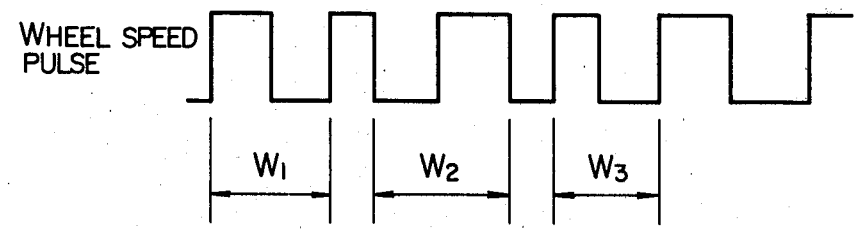
FIG. 10 illustrates how to obtain the pulse duration or width of the wheel speed pulses.

When the P and Q registers finish storing the contents of the free-running counter, the software generates an instruction to cause the P and Q registers to make a subtracting operation between them. The result of the subtraction is stored in, for example, an S register 153 of the register 127. If the subtraction causes a carry signal, the subtraction is done in consideration of the carry signal. The wheel speed is obtained from the above result. In some cases, it may be difficult due to the mechanical structure of the wheel speed sensor to obtain uniform WSPs and therefore the I/O circuit may receive a signal having various duty cycles from the sensor. In such cases, if the wheel speed is determined by measuring the duration of a single pulse, a large error may be introduced depending on the instant of sampling, degrading the accuracy in measurement. To make the error in measurement minimum, the pulse widths W1, W2, W3, ... etc. of several wheel speed pulses are measured as shown in FIG. 10 and the average W of them is calculated. By using the calculated average W as the wheel speed data for the succeeding calculation, the deviation of the output of the wheel speed sensor can be compensated to a great extent.

In the case of low wheel speed, the state of the wheel being at low speed should be checked in the step 35 in FIG. 3 and signals in synchronism with the leading and trailing edges of a wheel speed pulse can be used as trigger signals. Accordingly, it is possible to obtain sufficient wheel speed data even during low speed drive by measuring the wheel speed data every half a cycle which data has hitherto been measured every cycle.

According to this invention, the newest data is stored always in the location of the RAM with the address No. 1 and the next newest data in the location of address No. 2 and so on, and all the data are stored in order of arrival at the RAM so that the program for the calculation of the wheel speed can be easily executed.

FIG. 11 is a flow chart illustrating the process of loading the content of the free-running counter into the memory according to this invention.

The start step 20 is followed by step 21 where a check is made of whether a pulse is received or not. If a pulse is received, an interruption for a processing operation takes place in step 22. In the step 22, each data location in the RAM is shifted down by one location, that is, the content of the address No. 8 is transferred to the address No. 9, the content of the address No. 7 to the address No. 8, etc. After the content of the addres No. 1 has been transferred to the location of address No. 2, the content, or count value, of the free-running counter is read in step 23, and stored in the location of address No. 1. This process is shown in FIGS. 12 to 15. FIG. 13 shows the state of the data being stored in the RAM when the pulse WSP9 is received. The newest data T9 is stored in the address No. 1 and the successive addresses of the RAM are occupied by the data blocks in order of the arrival. FIG. 14 shows the state of the data blocks being stored in the RAM when the pulse WSP10 is received. FIG. 15 shows the state of the data blocks being stored in the RAM when the pulse WSP12 is received. In both the states, the newest data is held in the address No. 1 and the following addresses are occupied by the data blocks arranged in order of the arrival. With this arrangement of data blocks, the difference between the data blocks stored in the addresses Nos. 1 and 2 may be obtained to calculate the pulse-to-pulse period, the difference between the data blocks in the addresses Nos. 1 and 9 to calculate eight times the period, the difference between those in Nos. 1 and 5 for four times the period, and the difference between those in Nos. 1 and 3 for twice the period. These periods have constant values and since it is unnecessary to check in each operation which addresses in the RAM are to be selected to provide data, the associated program and the resultant processing time can be both shortened.

Figure 16:
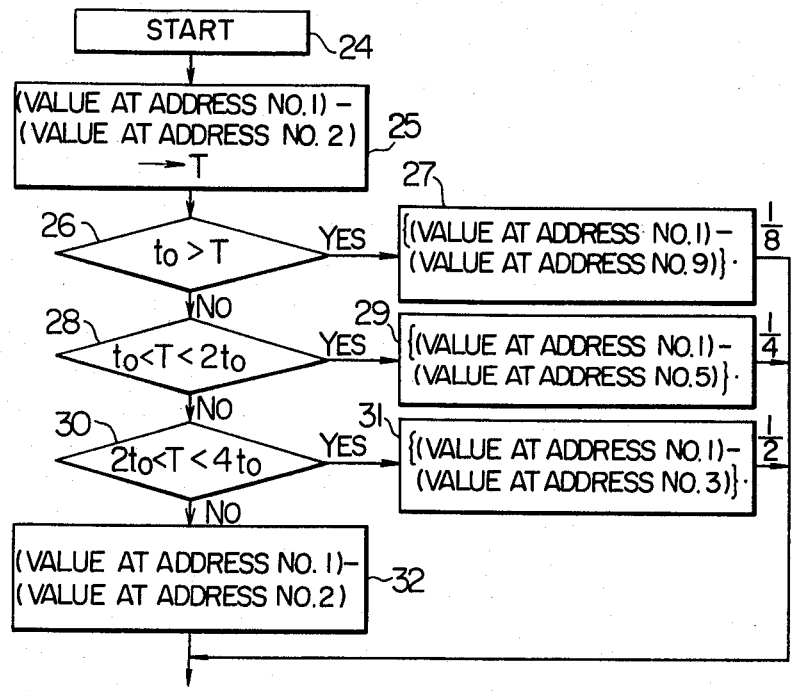
FIG. 16 is a flow chart for the process of calculating the wheel speed.

The above described process is shown in flow chart in FIG. 16. The processing is started with step 24, and the difference between the data blocks in the addresses Nos. 1 and 2 is calculated to obtain the pulse-to-pulse period in step 25. The difference, assumed to equal T, is compared with a reference value $t_o$ in step 26. If T is smaller than $t_o$, the difference between the data blocks in the addresses Nos. 1 and 9 is calculated in step 27 to obtain 8 times the pulse-to-pulse period. By dividing the resultant period by 8, the average pulse-to-pulse period is obtained with a reduced error. In step 28, whether $t_o < T < 2t_o$ or not is checked. If the condition that $t_o < T < 2t_o$ is satisfied, the difference between the data blocks in the addresses Nos. 1 and 5 is calculated in step 29 to obtain 4 times the pulse-to-pulse period. The obtained period is then divided by 4 to provide an average. In step 30, whether $2t_o < T < 4t_o$ or not is checked and if the in equality is satisfied, the data difference is calculated between the addresses Nos. 1 and 3 in step 31 to obtain twice the pulse-to-pulse period. Then, to calculate an average, the thus obtained period is divided by two. When $T > 4t_o$, the data difference is calculated between the addresses Nos. 1 and 2 to obtain only the pulse-to-pulse period.

As described above, by storing the newest data in the head location of the memory and also by occupying the succeeding locations of the memory by the data in order of the arrival, the calculation of the wheel speed can be processed in a short time with a high precision and the number of the steps of the program and therefore the capacity of the memory can be reduced, whereby an excellent anti-skid control apparatus can be provided.

Figure 17:
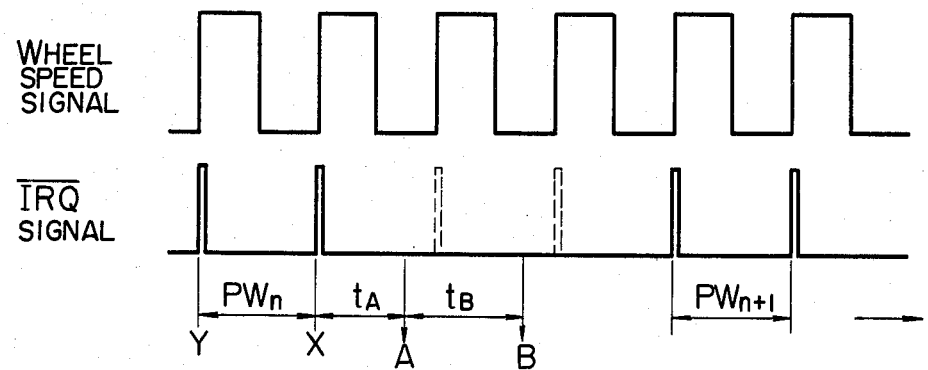
FIG. 17 shows the waveforms of the wheel speed signal and the $\overline{\text{IRQ}}$ signal according to this invention.

FIG. 17 shows the state where the sampling timing for detecting the wheel speed is varied when the wheel speed exceeds a certain value. At points Y and X, the content of the free-running counter is stored in the register and at point A after a time $t_A$ the pulse-to-pulse interval $PW_n$ is determined to calculate the wheel speed. During a time $t_B$ (between points A and B) the calculation results based on $PW_n$ is put up, and the $\overline{IRQ}$ signal, if it is received and the task has not yet been finished, is masked. The interrupt flag is cleared so as to accept the $\overline{IRQ}$ signal when the processing operation returns again to the starting step of the main routine after the end of the processing of the above task. By doing this, the task processing operation in the main routine is prevented from being retarded by the interrupt processing in response to the $\overline{IRQ}$ signal so that a normal processing operation is possible.

FIG. 18 shows a flow chart of a program for an embodiment of this invention. FIG. 18 is a detailed version of the step 35 shown in FIG. 3, with an instruction for clearing the $\overline{IRQ}$ mask bit applied to the connector ⓙ shown in FIG. 4. In FIG. 18, the content of the free-running counter that has been stored in a specified memory in response to the $\overline{IRQ}$ signal is read out in step 100 and the read out contents of the free-running counter are subjected to subtraction to obtain the pulse width PW for the wheel speed signal in step 105. In step 110, the thus obtained pulse width PW is compared with a predetermined pulse width $PW_o$. If $PW < PW_o$, the pulse width is calculated in step 125 and the $\overline{IRQ}$ mask bit is set in step 130. If $PW \geq PW_o$, the steps 37-45 in FIG. 3 and the steps 50-75 in FIG. 4 are executed and after the execution of these steps the $\overline{IRQ}$ mask bit is cleared in step 120 and again the step 100 is reached.

A still faster processing operation would be required in the case of a high speed wheel rotation where the next wheel speed pulse is received while the processing routine (step 115) using the pulse width (i.e. wheel speed difference) obtained through the calculation in the step 125 is under execution. In such a case, to mask the $\overline{IRQ}$ signal as described above, the $\overline{IRQ}$ mask bit is set to mask several pulses and an interruption is prevented to increase the speed of processing by clearing the $\overline{IRQ}$ mask bit at the time when the arithmetic processing routine (step 115) is finished.

In FIG. 18, if the pulse width PW becomes smaller than the predetermined pulse width $PW_o$, the step 130 is executed to set the $\overline{IRQ}$ mask bit. Accordingly, unless the $\overline{IRQ}$ mask bit is cleared in the step 120 after the execution of the step 115, the $\overline{IRQ}$ signal for detecting the wheel speed will be ignored even if it is received while the step 115 is under execution in the main program. After the execution of the step 120, the $\overline{IRQ}$ signal for detecting the wheel speed is accepted to resume the detection of the wheel speed.

If the wheel speed is lowered to cause the pulse width to be greater than $T_o$, the wheel speed data is stored in the data addresses in the RAM to execute normal control processing, i.e. tasks such as the check of skid state, the delivery of the brake releasing signal, the release of braking, and the measurement of ON TIME.

As described above, by making variable the sampling timing for detecting the wheel speed through the control of software and by detecting the wheel speed at the time of high speed rotation by the use of the variable sampling timing, the MPU can be prevented from being occupied for the purpose of detecting the wheel speed so that the above task is prevented from being retarded.

What we claim is:

1. A method of determining wheel speed for a skid control device using a wheel speed sensor; a control circuit including therein a microcomputer, calculating the wheel speed on the basis of the pulse signal from said wheel speed sensor, and delivering a brake releasing signal when the wheels slip; and a brake oil control apparatus for controlling the pressure of oil used in the wheel braking means, wherein said microcomputer comprises a free-running counter for counting clock pulses and a memory having a sequence of storage locations for storing the content, or count values, of said free-running counter, and means for forming an interrupt request signal by the use of said pulse signal from said wheel speed sensor, wherein said method comprises:

a storing step including the steps of
storing in a pregiven one of said sequence of storage locations in said memory, the contents of said free-running counter at the time said respective interrupt request signal is generated, and
transferring the contents in said pregiven location and successively adjacent locations in said memory to the location adjacent to said pregiven location and successively adjacent locations thereto in said memory, respectively; and
a calculating step including
a first step of calculating the difference between the values stored in said head location and a predetermined lower location;
a second step of determining the number of wheel speed pulses to be used for calculating an average number of pulses which are produced during an interval between two successive wheel speed pulses in accordance with the magnitude of said difference obtained in said first step, and then selecting the location in said memory corresponding to this number of wheel speed pulses from which the stored value is derived;
a third step of calculating the difference between the values stored in said head location and said location selected in said second step and then determining the average number of clock pulses between successive wheel speed pulses; and
a fourth step of calculating the wheel speed from the result obtained by said third step.

2. Method as claimed in claim 1, further including the step of setting a mask bit for an interrupt signal to be executed when said difference obtained in said first step exceeds a predetermined value.

3. In a method of of operating a processor controlled system for controlling a wheel braking apparatus in a vehicle, said system including wheel speed sensor means for producing pulses representative of wheel speed a free-running counter for counting clock pulses supplied thereto, and a memory for selectively storing the contents of said free-running counter, said method including determining the wheel speed by the steps of:

(a) generating processor interrupt signals in response to selected ones of successive pulses from said wheel speed sensor means;
(b) in response to a respective one of said interrupt signals, storing, in a prescribed location in memory, the contents of said free-running counter at the time said respective interrupt signal is generated, and transferring the contents of said prescribed and successively adjacent locations in memory to the location in memory immediately adjacent said prescribed location and successively adjacent locations in memory, respectively;
(c) selectively determining the difference between the contents of said prescribed location in memory and the contents of one of said successively adjacent locations in memory; and (d) determining wheel speed in accordance with the difference determined in step (c).

4. A method according to claim 3, wherein step (c) comprises the steps of:
 (c-1) determining the difference between the contents of said prescribed and immediately adjacent locations in memory, and
 (c-2) determining the difference between the contents of said prescribed location in memory and the contents of a selected one of said successively adjacent locations in memory in accordance with a prescribed relationship between the difference obtained in step (c-1) and a predetermined value.

5. A method according to claim 4, wherein step (c-2) comprises the steps of determining the difference between the contents of said prescribed location in memory and the contents of a selected one of said successively adjacent locations in memory in accordance with a set of preestablished relationships between the difference between the contents of said prescribed location in memory and the contents of said immediately adjacent location in memory and multiples of said predetermined value.

6. A method according to claim 3, wherein step (a) comprises selectively masking the generation of an interrupt signal for a pulse from said wheel speed sensor means in response to the difference between the contents of said prescribed and immediately adjacent locations in memory exceeding a predetermined value.

7. A method of determining wheel speed for a wheel containing apparatus employing a wheel speed sensor; a control circuit including therein a microcomputer, calculating the wheel speed on the basis of the pulse signal from said wheel speed sensor, and delivering a wheel control signal when the wheels slip; and a wheel movement control apparatus for controlling the movement of wheels, wherein said microcomputer comprises a free-running counter for counting clock pulses and a memory for storing the content, or count values, of said free-running counter, and wherein the said method comprises:
 a first step of forming an interrupt processing signal by the use of said pulse signal from said wheel speed sensor;
 a second step of interrupting the program under execution and storing in the head location of said memory the count value of said free-running counter at the time when said interrupt processing signal is delivered;
 a third step of transferring the above stored count value of said free-running counter from said head location to the second location in response to the interrupt processing signal delivered after one to several cycles of said pulse signal, storing the count value of said free-running counter at that moment in said evacuated head location, and storing the count values from said head location downward in said memory in order of arrival;
 a fourth step of calculating a difference between the values stored in said head location and a predetermined location;
 a fifth step of determining the number of wheel speed pulses to be used for calculating an average in accordance with the magnitude of said difference obtained in said fourth step and then selecting the location in said memory from which the stored value is taken out;
 a sixth step of calculating a difference between the values stored in said head location and said location selected in said fifth step and then obtaining the average wheel speed; and
 a seventh step of calculating the wheel speed from the result obtained by said sixth step.

8. A method of determining wheel speed in a processor-controlled system for controlling a wheel-containing apparatus, said system including wheel speed sensor means for producing pulses representative of wheel speed, a free-running counter for counting clock pulses supplied thereto, and a memory for selectively storing the contents of said counter, said method including the steps of:
 (a) generating processor interrupt signals in response to selected ones of successive pulses from said wheel speed sensor means;
 (b) in response to a respective one of said interrupt signals, storing, in a prescribed location in memory, the contents of said free-running counter at the time said respective interrupt signal is generated, and transferring the contents of said prescribed and successively adjacent locations in memory to the the location in memory immediately adjacent said prescribed location and successively adjacent locations in memory, respectively;
 (c) selectively determing the difference between the contents of said prescribed location in memory and the contents of one of said successively adjacent locations in memory; and
 (d) determining wheel speed in accordance with the difference determined in step (c).

9. A method according to claim 8, wherien step (c) comprises the steps of:
 (c-1) determining the difference between the contents of said prescribed and immediately adjacent locations in memory, and
 (c-2) determined the difference between the contents of said immediately adjacent location in memory and the contents of a selected one of said successively adjacent locations in memory in accordance with a prescribed relationship between the difference obtained in step (c-1) and a predetermined value.

10. A method according to claim 9, wherein step (c-2) comprises the steps of determining the difference between the contents of said prescribed location in memory and the contents of a selected one of said successively adjacent locations in memory in accordance with a set of preestablished relationships between the difference between the contents of said prescribed location in memory and the contents of said immediately adjacent location in memory and multiples of said predetermined value.

11. A method according to claim 8, wherein step (a) comprises selectively masking the generation of an interrupt signal for a pulse from said wheel speed sensor means in response to the difference between the contents of said prescribed and immediately adjacent locations in memory exceeding a predetermined value.

* * * * *